(12) United States Patent
Sørensen et al.

(10) Patent No.: US 7,935,901 B2
(45) Date of Patent: May 3, 2011

(54) ACTUATOR ASSEMBLY AND BED

(75) Inventors: René Sørensen, Gråsten (DK); Marin K. Knudsen, Sydals (DK)

(73) Assignee: Linak A/S, Nordborg (DK)

( * ) Notice: Subject to any disclaimer, the term of this patent is extended or adjusted under 35 U.S.C. 154(b) by 261 days.

(21) Appl. No.: 11/988,681

(22) PCT Filed: Jul. 13, 2006

(86) PCT No.: PCT/DK2006/000414
§ 371 (c)(1),
(2), (4) Date: Jan. 11, 2008

(87) PCT Pub. No.: WO2007/006314
PCT Pub. Date: Jan. 18, 2007

(65) Prior Publication Data
US 2009/0050451 A1 Feb. 26, 2009

(30) Foreign Application Priority Data

Jul. 13, 2005 (GB) .................... 0514392.0
Aug. 30, 2005 (DK) .................. 2005 01201
Feb. 20, 2006 (GB) .................... 0603326.0

(51) Int. Cl.
*H01H 3/04* (2006.01)
(52) U.S. Cl. .................. 200/17 R; 200/522; 5/186.1
(58) Field of Classification Search ............... 200/17 R, 200/522, 61.41, 61.91
See application file for complete search history.

(56) References Cited

U.S. PATENT DOCUMENTS

| | | | |
|---|---|---|---|
| 2,910,027 A * | 10/1959 | Winz | 112/272 |
| 3,534,913 A | 10/1970 | Lawrenson | |
| 4,905,634 A * | 3/1990 | Veldman | 123/46 SC |
| 4,920,816 A | 5/1990 | Inabe et al. | |
| 5,153,951 A * | 10/1992 | Hester | 5/37.1 |
| 5,161,274 A * | 11/1992 | Hayes et al. | 5/618 |
| 5,666,715 A * | 9/1997 | Zoiss et al. | 29/566.4 |
| 6,452,293 B1 | 9/2002 | Roither | |
| 7,047,834 B2 * | 5/2006 | Nielsen et al. | 74/89.38 |
| 2004/0158176 A1 * | 8/2004 | Park | 601/18 |
| 2008/0134815 A1 | 6/2008 | Larsen et al. | |

FOREIGN PATENT DOCUMENTS

| | | |
|---|---|---|
| DE | 19532590 | 3/1997 |
| EP | 577541 | 1/1994 |
| EP | 0685662 | 12/1995 |

OTHER PUBLICATIONS

English Abstract of DE 19532590.

* cited by examiner

*Primary Examiner* — Renee Luebke
*Assistant Examiner* — Lisa Klaus
(74) *Attorney, Agent, or Firm* — Dykema Gossett PLLC

(57) ABSTRACT

Actuator system comprising at least one actuator, a control unit, a power supply and an operations panel, where the actuator in a transmission between an activation element (4) and a reversible electric motor is inserted a quick release unit (13) for release of the activation element (4) from the electric motor and the part of the transmission between the motor and the quick release. The actuator comprises at least one electrical switch (30), activated with the quick release. The signal from the electrical switch(es) (30) may be used for various purposes, such as triggering a power supply from sleep mode, activating one or more actuators, or activating an external function such as an alarm etc.

8 Claims, 4 Drawing Sheets

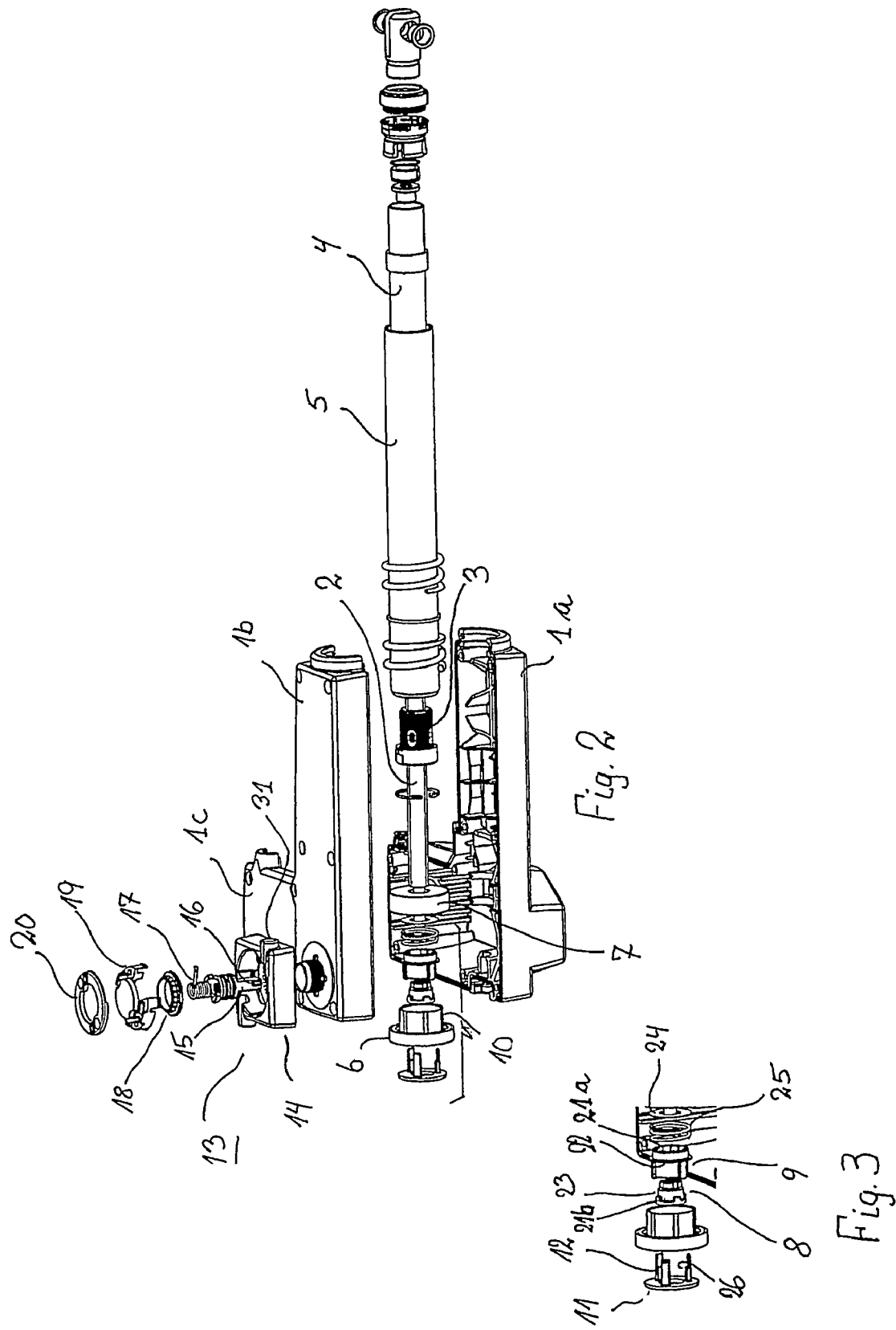

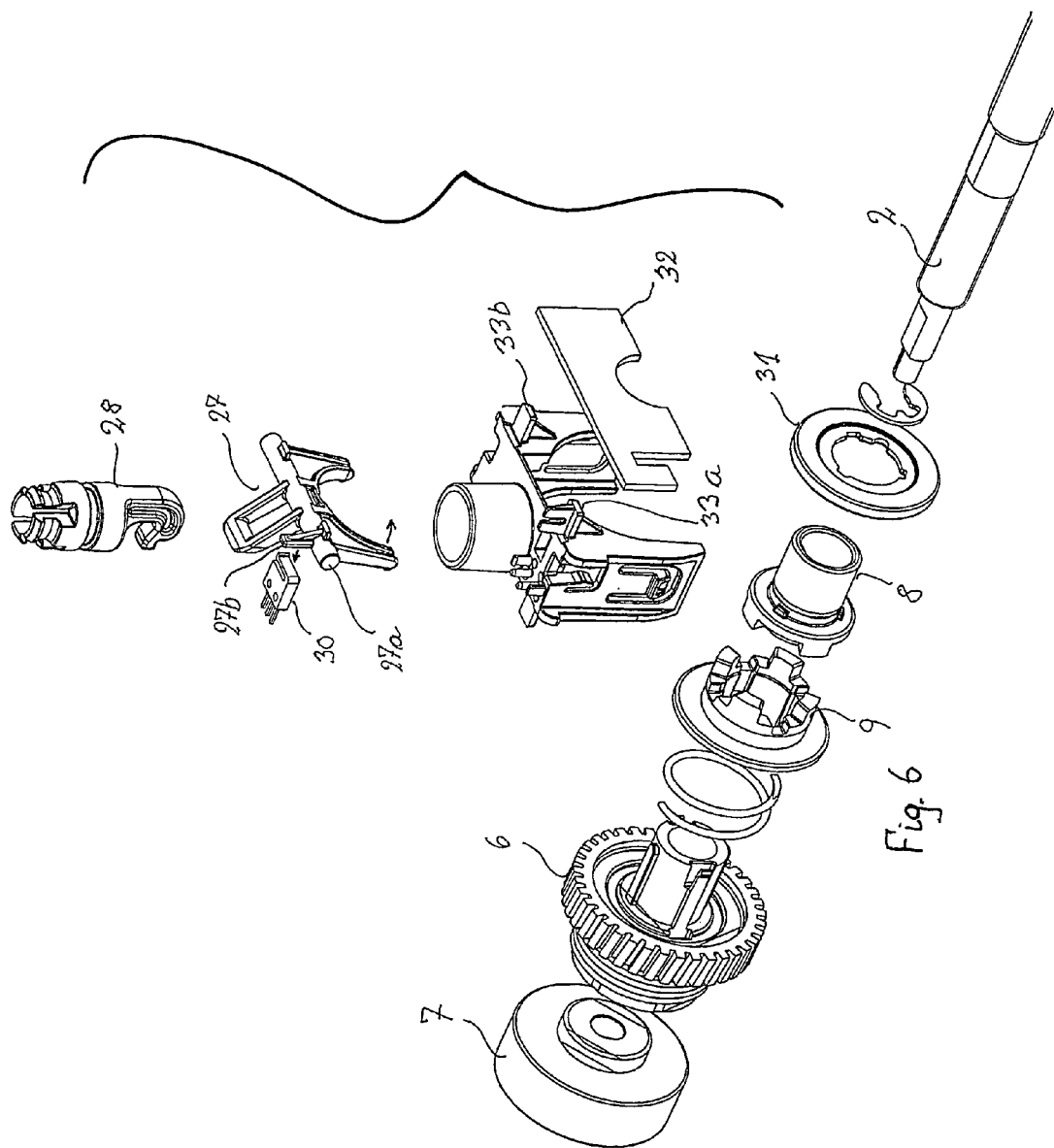

US 7,935,901 B2

ACTUATOR ASSEMBLY AND BED

BACKGROUND OF THE INVENTION

1. Field of the Invention

The invention relates to an actuator assembly which has a quick release ability.

2. The Prior Art

A quick release in an actuator is used for temporary release of the activation element for manual setting without the drive unit. Examples of the potential use of a quick release are in hospital beds, patient hoists, fire doors and other constructions where it is important, if not essential, to be able to spontaneously set the activation element.

Actuators with quick release function are well known, for example, EP 685 662 B1, WO 03/033946 A1 and WO 2006/039931 A1 and EP 577 541 B1 all in the name of Linak A/S. The first three documents relate to a quick release construction based on a releasable clutch spring around two cylinder parts. The last document EP 577 541 relates to a quick release construction where a gear can be displaced from engagement.

In some situations it is desirable or essential to activate another function as a result of the quick release. Generally, this may be activation of a power supply and/or controls for the actuator and/or activation of one or more actuators simultaneously with the release of the quick release.

The object of the invention is to provide a solution to the problem described.

SUMMARY OF THE INVENTION

This is achieved in the invention by designing an actuator assembly which includes at least one electrical switch which is activated when the quick release is released. The signal from the electrical switch(es) may be used for various purposes, such as activating a power supply and/or control from sleep mode, activating one or more actuators, or activating an external function such as an alarm, etc. The circuit, of which the switch is part, will typically be designed for the switch to close a circuit, but the circuit may also be designed for the switch to break the circuit. The electrical contact is appropriately mounted in the actuator so that it is activated by one or more of the moveable construction elements in the quick release. Most suitably, it is the construction elements in the release mechanism itself, but it may however also be construction elements in the coupling parts of the quick release, such as the gear in the quick release as defined in EP 577 541 or a spring end or cylinder part in the constructions with coupling springs.

An actual implementation of the actuator system, which relates to a bed equipped with an actuator assembly, where the actuator for the back rest section comprises a quick release with an electrical switch activated by the release of the quick release. The bed is further equipped with position determination in a suitable manner.

A linear actuator according to the invention will be described below with reference to the attached drawings.

BRIEF DESCRIPTION OF THE DRAWINGS

FIG. 2 shows an exploded view of an actuator with a quick release unit;
FIG. 3 shows a detailed view of the quick release unit;
FIG. 6 is an exploded view of the quick release unit of the present invention.

DETAILED DESCRIPTION OF THE PREFERRED EMBODIMENTS

Figure 1:
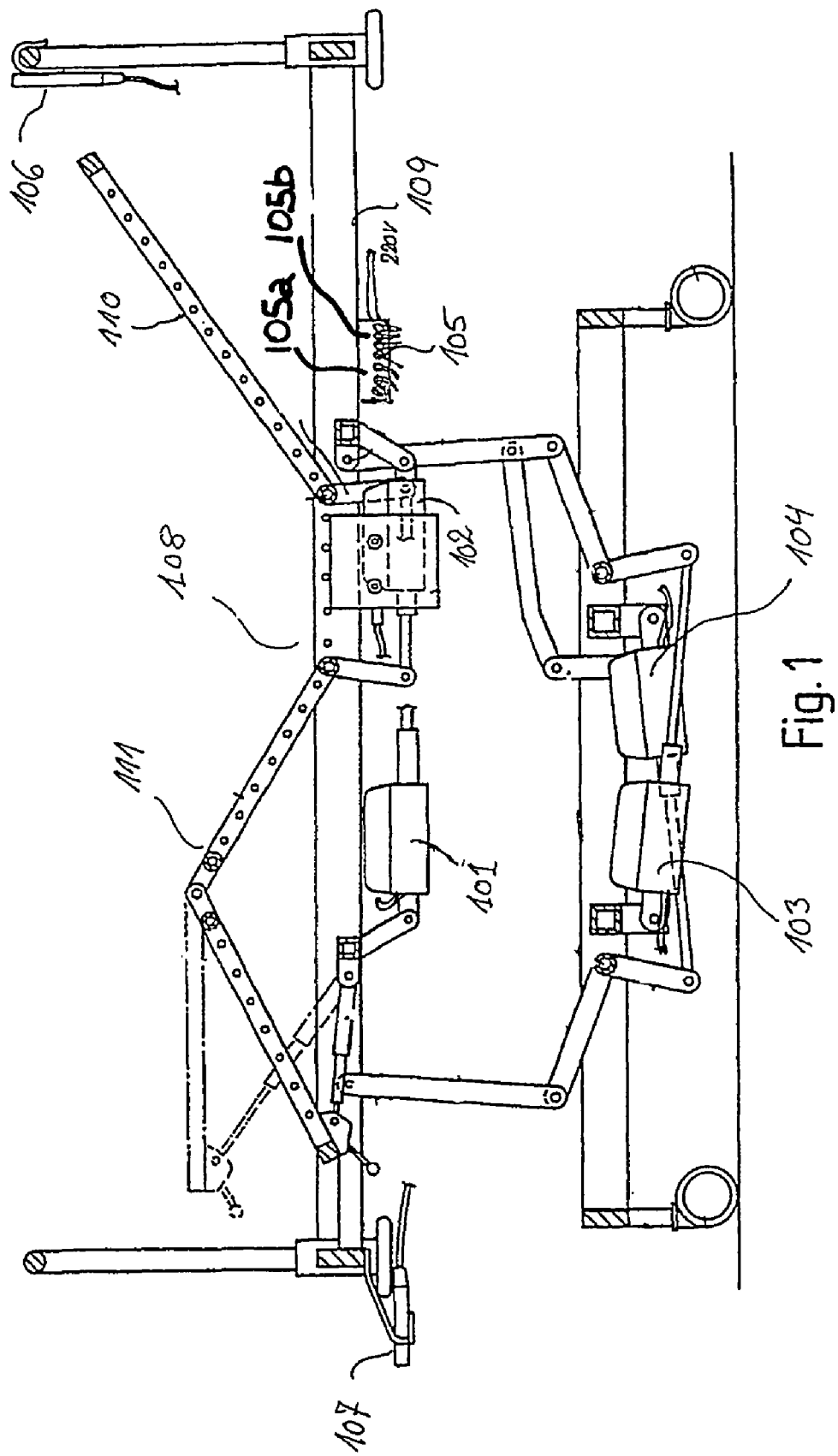
FIG. 1, shows a hospital bed with four actuators.

FIG. 1 shows a hospital bed equipped with an actuator assembly comprising four actuators 101-104, a control box 105 containing a power supply and a control; and a hand operation 106 and an operations panel (ACP) 107 at the end of the bed. The power supply consists of a low voltage unit, typically transformer-based, and a rechargeable battery pack. Two of the actuators 101, 102 are for adjustment (profiling) of the base 108 carrying the mattress, while the other two 103, 104 are for height adjustment of the upper frame 109 on which the base is mounted. The two last mentioned actuators also allow for tilting of the base frame over a transverse axis (Trendelenburg/Anti-Trendelenburg position).

FIG. 2 shows an actuator with a quick release construction of the type mentioned in WO 2006/039931, more exactly FIGS. 1-7. The main elements of the actuator are a cabinet in two parts 1a, 1b with a reversible electric motor, which through a worm gear drives a spindle 2 with a spindle nut 3, on which an activation rod 4 (inner tube) is surrounded by a protective tube 5 (outer tube) is attached. Note that the motor is not shown in the drawing, but it is located in the perpendicular section 1c of the cabinet. The motor shaft extends into a worm engaging a worm wheel 6. The spindle 2 is seated in the cabinet with a ball bearing 7.

DETAILED DESCRIPTION OF THE PREFERRED EMBODIMENTS

FIG. 1 shows a hospital bed equipped with an actuator assembly comprising four actuators 101-104, a control box 105 containing a power supply 105a and a control 105b; and a hand operation 106 and an operations panel (ACP) 107 at the end of the bed (operation unit). The power supply consists of a low voltage unit, typically transformer-based, and a rechargeable battery pack. Two of the actuators 101, 102 are for adjustment (profiling) of the base 108 carrying the mattress, while the other two 103, 104 are for height adjustment of the upper frame 109 on which the base is mounted. The two last mentioned actuators also allow for tilting of the base frame over a transverse axis (Trendelenburg/Anti-Trendelenburg position).

The quick release construction, consisting of an inner and an outer coupling part 8,9, where the inner coupling part 8 is mounted at the end of the spindle 2, while the outer coupling part 9 is mounted in the worm wheel 6. This worm wheel is on the side facing the front end of the actuator, designed with a hollow cylindrical part that accommodates the outer coupling part 9 for torque transfer with a spline connection.

In the back of the worm wheel is a circular disc with three legs protruding through the openings in the worm wheel into the hollow cylindrical part and guided there. In the upper part 1b of the cabinet is a release mechanism 13 in a housing 14 with an entry for a cable (not shown) leading to an operating handle (not shown either). The release mechanism comprises an axle unit 15, led down behind the circular disc 11. At the end of the axle unit there is a cam 16 which is brought into contact with the disc 11 by turning the axle unit and the disc presses this forward towards the worm wheel. The axle unit is spring loaded with a spring 17, to an inactive position, i.e., a position where the cam 16 is not in contact with the disc 11. A ring 18 is attached at the upper end of the axle, to which the end of the cable leading to the operating handle is attached.

The outer coupling part 9, connected to the worm wheel, has an internal torque transfer spline connection 21a in the front. On the outer side of the coupling part 9 at the front end, in front of the spline connection to the worm wheel, there is a flange 22.

The inner coupling part 8 has a narrow part 23 in the front to enable it to pass through the opening in the part of the spline connection 21a placed in the outer coupling part 9. The other part of the spline connection is part of the step between the narrow end 23 and the outer side of the coupling part. In the narrow part 23 there is a groove for a disc 24, creating a flange.

The quick release is activated by operating the release mechanism, which turns the cam 16 on the axle unit 15 into contact with the disc 11, which is then pushed forward. The spline connection 21a, 21b between the outer coupling part 9 and the inner coupling part 8 will thus be interrupted and the spline will rotate freely, independent from motor and transmission. The activation rod 4 of the actuator and therefore the element attached to it, will then be manually adjustable.

An electrical contact in the form of a micro switch is placed next to the turning axle 15, and a cam opposite to cam 16 activates the micro switch at the same time as the quick release is activated. This sends an electrical signal through the cable connection to the control unit, which is brought from sleep mode, more precisely the power supply for the control is activated, that is, the part of the power supply comprising the rechargeable battery pack. By keeping the battery pack switched off until it is required, i.e. use 'on demand', means a substantial saving in the battery pack power. When the bed is connected to mains power, the low voltage unit is active. Placing the switch in the actuator itself has the advantage that further cabling is avoided and only a cable for the actuator is required.

When the bed is without mains power and the back rest section 110, must be moved rapidly to the horizontal position, such as in the case of a patient with cardiac arrest, this is achieved by activating the quick release. Simultaneously the control is brought from sleep mode and the bed becomes fully operational. The leg section 111 may be moved to horizontal position and, if required, may be brought into Trendelenburg position.

Figure 4:
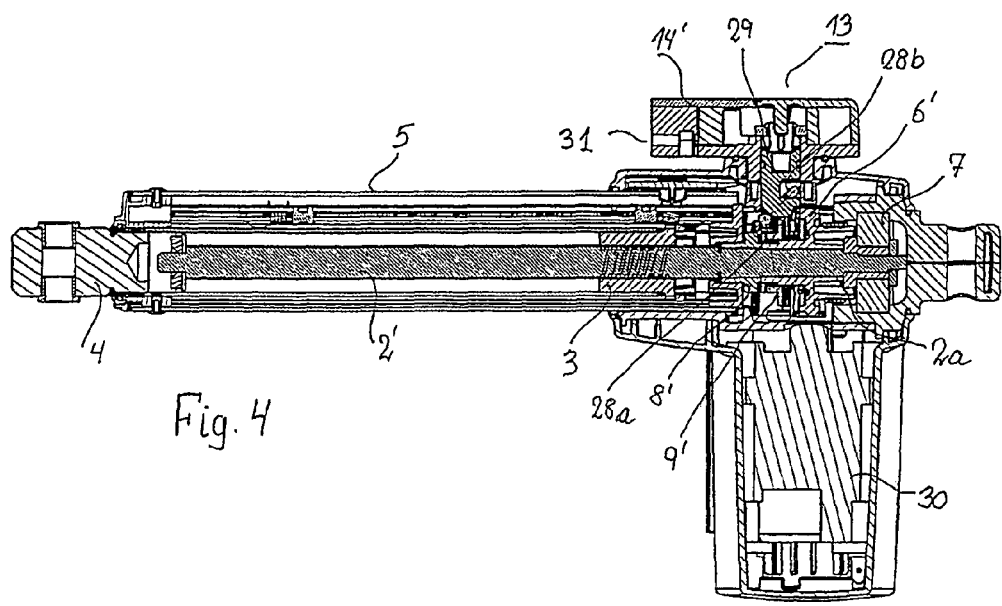
FIG. 4 is a longitudinal section through another actuator.
Figure 5:
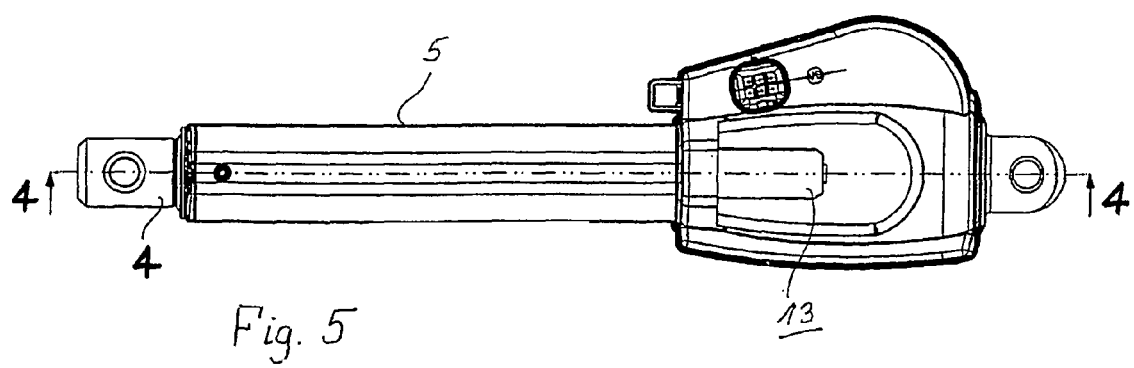
FIG. 5 is a side view of the actuator of FIG. 4.

In FIGS. 4-5, the actuator shown is the same type as specified in WO 2006/039931 Linak A/S, specifically in FIGS. 8-15, and this is referred to as part of the present application. In FIG. 4 to elements labeled 2', 6', 8', 9' and 14' correspond to elements 2, 6, 8, 9 and 14 in the FIGS. 2-3 embodiment. The quick release construction itself is shown in FIG. 6. The release mechanism consists of a tilting element 27, that takes an inclined resting position. An axially sliding element 28 with a hook at the end grabs the tilting element and is connected to the operating handle by a cable. By operating the handle, the element 28 is pulled upwards and brings the tilting element 27 to a vertical position, releasing the quick release as previously described.

The inner coupling part 8 is equipped with a magnetic ring 31 with four poles used to determine the position of the activation rod 4. Two Hall-elements, or sensors, 33a, 33b are mounted on a small printed circuit board 32 in conjunction with this. The Hall-elements are activated when a pole passes these on rotation of the magnetic ring, thereby sending a signal to the control unit which, by means of a microprocessor, computes the position of the activation rod 4 based on the rotation, its direction and the thread pitch of the spindle. Because the two Hall-elements are angularly displaced in relation to the magnetic ring 31, the rotation direction of the spindle can be detected (quadrature detection) and determines if signals must be added or subtracted depending on the extension or retraction of the activation rod 4. As the magnetic ring 31 is mounted to the inner coupling part 8, the ring 31 always rotates with the spindle, i.e., also in the situation where the spindle is released from the motor/transmission. In this way the position of the activation rod is known at all times, also after activation of the quick release.

The actuator illustrated in FIG. 2 may be similarly equipped with a magnetic ring on the inner coupling part and Hall-elements, hence the position of the activation rod is also known in this case, regardless of whether the quick release has been activated or not.

The invention claimed is:

1. An actuator system comprising
a linear actuator which includes:
   a reversible electric motor,
   a transmission,
   a spindle driven by the electric motor via the transmission,
   a spindle nut able of traveling the spindle,
   an activation element in connection with the spindle nut,
   a quick release unit for release of the activation element from the electric motor, and
   a release mechanism for operating the quick release unit;
a control unit,
an operation unit,
a power supply, and
an electrical contact which is activated by activation of the release mechanism of the quick release unit.

2. The actuator system according to claim 1, wherein the electrical contact is a micro switch.

3. The actuator system according to claim 2, wherein the switch is connected to cabling connecting the actuator and control unit.

4. The actuator system according to claim 1, wherein the electrical contact closes a circuit upon activation.

5. The actuator system according to claim 4, wherein said circuit includes said power supply.

6. The actuator system according to claim 1, wherein the actuator includes an activation rod, and including sensors for position determination for the activation rod in combination with a multi poled magnetic ring which detects movement and direction of movement of the activation rod.

7. A bed comprising a back section and an actuator system for the back section comprising an actuator which includes a reversible electric motor, an activation element, a transmission between the electric motor and the activation element, and a quick release unit for release of the activation element from the electric motor;
   a control unit, an operation unit, a power supply, and a release-mechanism having an electrical contact which is activated by activation of the release mechanism.

8. The bed according to claim 7, wherein the actuator includes an activation rod, and including sensors for position determination of the activation rod.

* * * * *